(12) United States Patent
Kulhalli et al.

(10) Patent No.: US 6,822,679 B1
(45) Date of Patent: Nov. 23, 2004

(54) OFFSET CORRECTION TO THE OUTPUT OF A CHARGE COUPLED DEVICE

(75) Inventors: Suhas R. Kulhalli, Bangalore (IN); Subhashish Mukherjee, Bangalore (IN); Sindhuja Sridharan, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 807 days.

(21) Appl. No.: 09/703,471

(22) Filed: Oct. 31, 2000

(51) Int. Cl.⁷ .............................................. H04N 5/232
(52) U.S. Cl. ...................................... 348/246; 348/311
(58) Field of Search ........................... 348/207.99, 241, 348/243, 244, 246, 247, 248, 249, 251, 311

(56) References Cited

U.S. PATENT DOCUMENTS

| | | | |
|---|---|---|---|
| 4,237,488 A | * 12/1980 | Takemura | 348/616 |
| 5,327,246 A | * 7/1994 | Suzuki | 348/246 |
| 6,747,697 B1 | * 6/2004 | Lin et al. | 348/246 |

* cited by examiner

*Primary Examiner*—Tuan Ho
(74) *Attorney, Agent, or Firm*—J. Dennis Moore; W. James Brady, III; Frederick J. Telecky, Jr.

(57) ABSTRACT

The voltage outputs of a charge coupled device (CCD) are examined to determine the hot pixels. A black pixel is determined to be a hot pixel if the voltage level associated with the black pixel exceeds the voltage level of an adjacent (e.g., previous) pixel by a threshold. If the present black pixel is determined to be a hot pixel, a previous black pixel is substituted for a present black pixel in the computation of the offset. However, if the first black pixel is determined to be a hot pixel, the second black pixel is used in lieu of the first black pixel. The offset is iteratively adjusted by an amount proportionate to an error determined based on the black pixels. The adjustment may be clipped by a threshold to avoid bands in the image.

33 Claims, 4 Drawing Sheets

OFFSET CORRECTION TO THE OUTPUT OF A CHARGE COUPLED DEVICE

RELATED APPLICATIONS

The present application is related to the following commonly assigned (or to be assigned) U.S. Patent Applications, which are both incorporated in their entirety herewith:

(1) Application serial number: Ser. No. 09/353,919 U.S. Pat. No. 6,750,010, entitled, "Optical Black and Offset Correction in CCD Signal Processing", filed on Jul. 15, 1999; and (2) Co-pending application Ser. No. 09/703,476, filed on Oct. 31, 2000, pending entitled, "Controlling the Range and Resolution of Offset Correction Applied to The Output of a Charge Coupled Device", filed on even date herewith.

BACKGROUND OF THE INVENTION

1. Field of the Invention

The present invention relates to charge coupled devices (CCD) typically used to capture color pictures in digital form, and more specifically to a method and apparatus for correcting the offset which is applied to the output of the CCDs.

2. Related Art

Charge coupled devices (CCDs) are often used to capture images received in the form of light. A CCD typically contains several pixels, with each pixel holding an amount of charge proportionate to the intensity of incident light and the length of time the light is allowed to fall on the pixel. The charge can be later translated to a voltage level and/or digital data for further processing and/or storing (in mass non-volatile storage). CCDs thus find application in devices such as digital cameras and scanners as is well known in the relevant arts.

A correction (termed "offset correction") is often applied to the output (i.e., voltage or digital data in the above paragraph) of a CCD typically to compensate for (or eliminate) undesirable components which may be present in the CCD output. For example, the charge generated by a CCD should ideally be entirely generated by the incident light but other phenomenon such as thermally generated electron-hole pairs add to the charge.

Such additions are undesirable, for example, because a later reproduced image may be brighter than that represented by the light incident on the CCD. Accordingly, it is desirable that the undesirable components be eliminated, and the corresponding correction is termed as offset correction. The extent to which a correction is applied, is referred to as an offset, and the act of applying the offset to the CCD output may be referred to as offset correction.

To facilitate the removal of such undesirable components, CCDs often include black pixels which are shielded from light when the active pixels are exposed to light. The charge in the black pixels may be deemed to represent the undesirable components to some extent, and accordingly the offset to the CCD charge is computed based on the charge present in the black pixels. The offset is thus subtracted from the CCD outputs to generate the true image (close to the image represented by the incident light).

One problem with the above noted approach of offset correction is that some of the black pixels may be "stuck" at a high charge level, for example, due to manufacturing defects. Such pixels are commonly referred to as hot pixels. An assumption that the charge related to hot pixels represents undesirable components, may lead to over correction of the output values of the CCDs. The resulting display artifacts are generally undesirable. Accordingly, it may be desirable to detect the presence of hot pixels and take any appropriate corrective action.

In one prior solution, a digital value representing the charge level of each black pixel is compared to a threshold value, and the black pixel is deemed to be a hot pixel if the corresponding digital value exceeds the threshold value. Hot pixels may be ignored from the computation of the offset correction.

One problem with such a prior solution is that the offset voltages may initially (e.g., at boot-up or when a new image is to be processed) be set to a small value with the result that a smaller value than that corresponding to the actual undesired components, may be subtracted from each of the output values. The result of the subtraction may be amplified prior to examination which determines whether corresponding pixels are hot pixels. As the error component is also amplified and contained within the examined values, the pixels may erroneously be determined to be hot pixels.

In the prior solution, all hot pixels may be ignored with respect to offset correction and thus the error component may manifest as artifacts in any reproduced images. Accordingly, the prior solution may be unacceptable at least in some environments. Therefore, what is needed is a method and apparatus which enables the hot pixels to be accurately detected so that any necessary corrective action can be undertaken.

Another typical requirement in the reproduction of images is that the offset be quickly computed such that the image can be reproduced quickly without display artifacts. Usually, the offset is computed iteratively and it is desirable that the offset converge to the correct value (representing the undesirable components) in a few iterations. In addition to fast convergence, it is desirable that adequate control be provided to correct the image by offsets of small granularity.

While quick convergence to the accurate offset value is desirable, it may be further desirable not to change substantially the offset within an image frame as such changes may result in display artifacts in the form of bands in the reproduced image. Therefore, what is needed is a flexible method and apparatus to correct the outputs of a CCD such that the corrected outputs accurately represent the image represented by the light incident on the CCD.

SUMMARY OF THE INVENTION

The present invention enables a digital representation of an image to be generated accurately. A charge coupled device (CCD) is first exposed to light from the image. The CCD typically contains active pixels which are charged proportionate to the intensity of the incident light and the time of incidence of the light. However, the charge may contain undesirable components (such as what is referred to as thermal noise). The present invention enables the undesirable components to be eliminated by examining the charge on the black pixels, which are not exposed to light.

According to an aspect of the present invention, the charge on each pixel is converted to voltage. A black pixel is determined to be a hot pixel if the voltage level of the black pixel exceeds the voltage level of a previous pixel by a specified amount. As the probability of two consecutive pixels being hot is low, the hot pixels may be detected accurately with a substantially high probability. The hot pixels may be ignored from the computation of an offset used to correct the voltage levels of the active pixels.

According to another aspect of the present invention, the offset may be computed by generating a weighted average of the voltages of black pixels in several lines. When a present black pixel is determined to be a hot pixel, the previous pixel (or voltage thereof) is substituted for the present black pixel. As the number of pixels used in computing average is always the same, the implementation of division operation may be simplified.

According to yet another aspect of the present invention, when a first pixel of a line is determined to be a hot pixel, the second pixel is provided in lieu of the first pixel in the computation of the average. In one embodiment, an adder adds the each present pixel digital value to a previous sum to generate a previous sum for the next iteration. To ensure that the average is generated without much pipeline delay, the difference of the first and second pixels is computed. When the first pixel is determined to be a hot pixel, the difference is subtracted from the previous sum (containing only the digital value of the first pixel), and the result is provided as the previous sum. As a result, the adder generates two times the value of the second pixel (i.e., second pixel is provided in lieu of first pixel), and the average is generated without much pipeline delay.

According to one more aspect of the present invention, the offset is incremented proportionate to the additional correction sought to be attained. As a result, convergence to the accurate offset (corresponding to the desired correction) may be quickly attained. In an embodiment, any change in the offset is clipped off at a ceiling (offset difference ceiling) to prevent bands in a reproduced image. That is, an upper limit is set to the change in brightness in adjacent areas due to the correction.

Yet another aspect of the present invention provides a designer the ability to control the correction range and to attain low correction resolution while minimizing the introduction of further undesirable components in the CCD output voltages as described below in the below paragraphs. The correction range refers to the maximum voltage correction (assuming zero voltage to be the minimum) that may be attained by the operation of various components of the offset correction circuit. Resolution refers to the minimum amount of correction of the output voltage that can be attained by the offset correction circuit.

In order to minimize the noise (i.e. addition of undesirable components noted above) and electrical power consumed, the number of stages in the signal path (or forward channel or path the signal takes from input till it gets converted to digital data) should generally be minimum. According to an aspect of the present invention, only two stages are required to achieve the required gain. Correlated double sampling operation is performed in the first stage, while attaining some amount of gain. The second stage is used to attain the remainder of the desired gain using a programmable gain amplifier (PGA). While the described embodiments contain only two stages, it should be understood that several aspects of the present invention can be implemented using a different number of stages.

In addition, while a solution could be implemented using only a single DAC (to achieve correction to the input signal), the same would typically require a DAC of very high resolution, which provides challenges in implementation and would normally consume more power. Thus, according to another aspect of the present invention, two DACs are used, once called the coarse DAC (CDAC) which is connected to a correlation double sampler (CDS) located in the first stage, and the second DAC, called the fine DAC (FDAC), is connected to the PGA in the second stage.

CDS may be implemented to amplify the input signal (voltage from the CCD) while partially correcting the signal. The correction may be controlled by a first capacitor (Ccdac) driven by the CDAC. The input signal may be received via a second capacitor (Csinp). The second input of both the first capacitor and the second capacitor are coupled to a feedback capacitor (Cfcds) implemented in conjunction with the CCD.

As would be readily appreciated, the gain of the input signal component (as present at the output of the CCD) is determined by the ratio Csinp/Cfcds. Assuming that the voltage applied at the output of CDAC equal Vcdac and that the input voltage equals Vi, the total output (Vcds) of the CCD equals ((Vi*Csinp/Cfcds)−(Vcdac*Ccdac/Cfcds)), wherein '*' represents a multiplication operation. The capacitors and their capacitance values are represented by the same reference labels in the present application.

According to an aspect of the present invention, the ratio of Ccdac to Csinp is maintained to be a constant, which allows the offset effected to be independent of the voltage level Vi. The need for such independence may be appreciated by first understanding that it may be desirable to amplify the input signals to a degree which is inversely proportionate to the maximum possible amplitude (or range, if minimum is not equal to zero) of the input signal. Typically, the ratio of Ccdac/Cfcds is controlled to attain the desired amplification of the input signal in the first stage. By maintaining Ccdac/Csinp to be a constant, the offset correction due to the first stage can be determined by Vcdac, which in turn is determined by a numerical input to CDAC.

The output of the CDS may be connected to a capacitor Cspga, which in turn is corrected to the PGA of the second stage. Offset correction is further effected by a capacitor (Cfdac) driven by a fine DAC (FDAC). The second input of both Cspga and Cfdac is connected to a feedback capacitor (Cfpga) associated with the PGA. The output of PGA (Vpga) may be given by the equation ((Vcds*Cspga/Cfpga)−(Vfdac*Cfdac/Cfpga)), wherein Vfdac represents the output voltage of the FDAC.

According to another aspect of the present invention, the ratio of Cfdac to Cfpga is maintained to be a constant, which allows the correction resolution to potentially equal a least significant bit of an ADC (used to sample the output of the PGA). That is, the present invention allows offset correction to be effected by minute (small) amounts limited only by the resolution of a later sampling ADC.

Thus, once total desired amplification of the input signal (Vi) is determined, partial amplifications for each of the two stages may be assigned. The capacitances (Csinp, Cspga, Cfpga and Cfcds) may be configured consistent with the assigned partial amplifications. The capacitances Ccdac and Cfdac may be configured consistent with the objectives noted above with reference to correction range and correction resolution. By using the features of the present invention, offset correction, which quickly removes (at least substantially) the undesirable components, may be implemented.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

According to an aspect of the present invention, a black pixel of a CCD is determined to be a hot pixel based on a comparison with at least one adjacent pixel. In one embodiment, a black pixel is determined to be a hot pixel if the difference between the hot pixel and an adjacent black pixel exceeds a threshold value. As the probability of two adjacent black pixels being hot pixels is low, the presence of hot pixels is detected accurately with a high probability.

Another aspect of the present invention takes advantage of the fact that the undesirable components usually varies gradually across successive lines of a CCD. Specifically, multiple previous lines of black pixels are used in determining the offset correction for a present line. The determination of error in the closer lines may be assigned more weight than the farther lines. As a result any error in the offset determination may not lead to substantial correction of the CCD output.

Yet another aspect of the present invention allows fast convergence to the accurate offset value such that the undesirable components can be eliminated quickly from a reproduced image. Faster convergence is achieved by making the increments to present offset proportionate to the error of the present offset from a desired offset computed based on the active pixels in the black area. One more aspect of the present invention ensures that bands are not present in the reproduced image due to substantial correction by clipping the change in offset across adjacent areas to an upper threshold which may be programmed by a user (of the circuit).

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
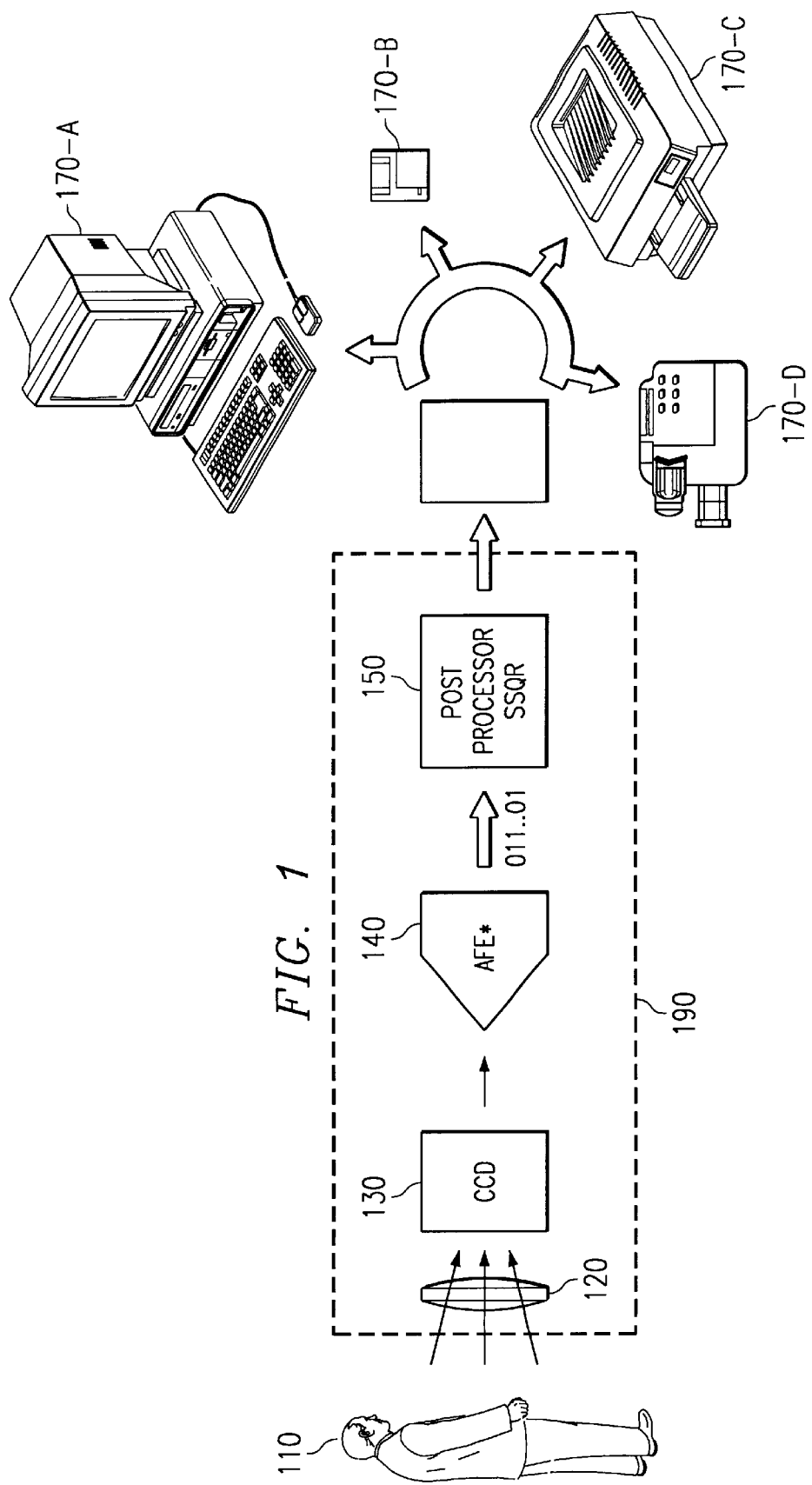
FIG. 1 is a block diagram illustrating an example environment in which the present invention can be implemented.

FIG. 1 is a block diagram illustrating an example environment in which the present invention can be implemented. There is shown the light from image 110 being allowed pass through device 190 (such as a digital camera or a scanner). The output of device can be used for further processing, printing or storing, etc., as described below in further detail.

With respect to device 190, the light from image 110 is shown being focused on CCD 130 by lens 120. CCD 130 contains several pixels which are charged proportionate to the product of the incident light intensity and the time of exposure to the light. The charge is converted into voltage in a known way and transferred to analog front-end (AFE) 140.

AFE 140 converts the received voltages into digital values, and transmits the digital values to post processor 150. AFE 140 may employ techniques such as correlated double sampling (which are well known in the relevant arts) in the course of generating the digital values. AFE 140 receives voltage values corresponding to both dark pixels and active pixels and performs offset correction in accordance with several aspects of the present invention as described below in further detail.

Post processor 150 processes the digital values received from AFE 140, generally to enhance the quality of image represented by the digital values and/or to convert the data into suitable format for storing. The resulting output data may be used in several ways, for example, viewed/edited by computer system 170-A, stored in floppy disk 170-B, printed on a printer 170-C r transferred to video player 170-D.

However, as noted in the background section above in greater detail, a robust offset correction approach may be needed to ensure that the reproduced images (e.g., in 170-A through 170-D) accurately represent image 110. An example offset correction approach implemented within AFE 140 is described below.

3. Method

Figure 2:
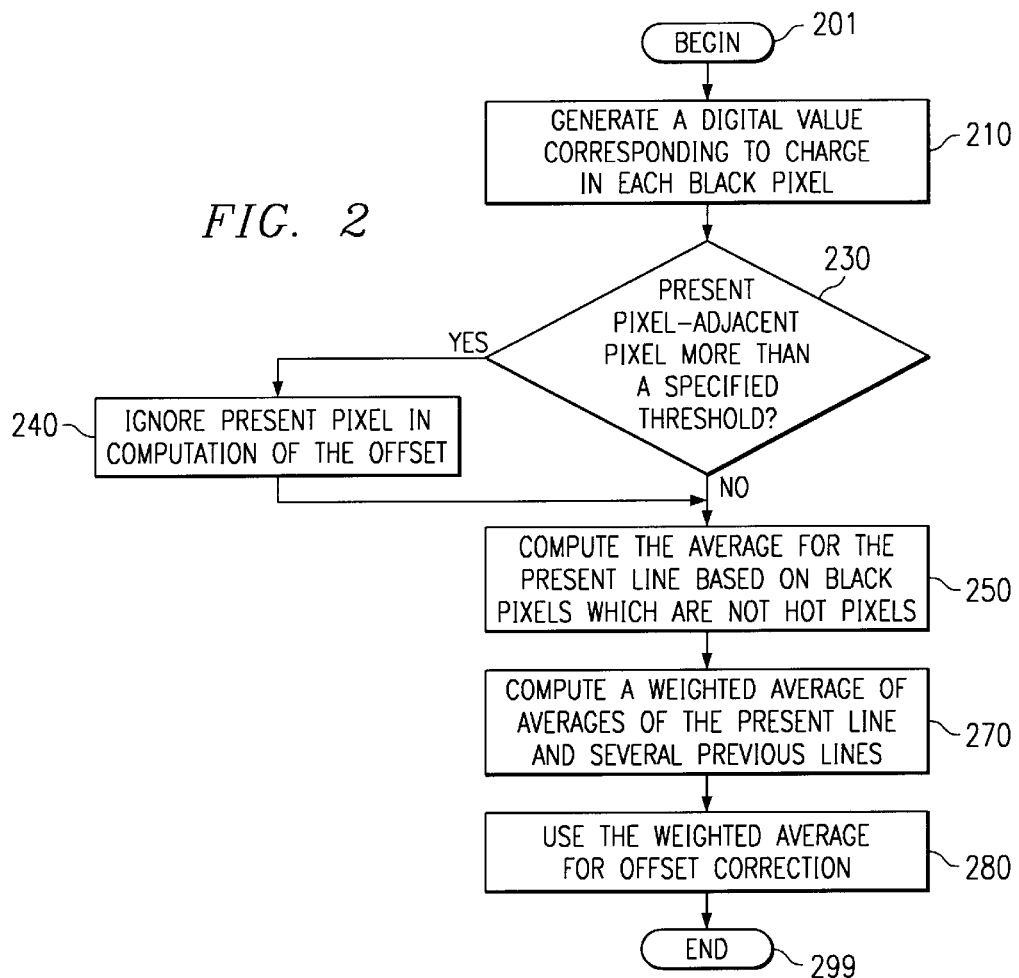
FIG. 2 is a flow chart illustrating a method in accordance with the present invention.

FIG. 2 is a flow chart illustrating a method for offset correction implemented in accordance with the present invention. The method begins in step 201, in which control immediately passes to step 210. In step 210, the charge in each black pixel of a CCD is converted to a digital value.

In step 230, the present pixel (or the digital value thereof) is compared to an adjacent pixel, and if the difference exceeds a threshold, the present pixel is ignored in the computation of the offset as noted in step 240. In one embodiment, the a previous pixel is used as the adjacent pixel. If the difference does not exceed the threshold, control passes to step 250.

In step 250, an average of the pixels for a present line is computed based on the black pixels which have been determined not to be hot pixels in step 230. In an embodiment described below, the computation is simplified by using a previous pixel in lieu of the present pixel in the computation.

In step 270, a weighted average of the averages (computed in step 250) is computed. The closer previous lines are assigned greater weight compared to the farther lines. In step 280, the weighted average is used as the offset to correct the pixel values generated for the active pixels.

As the probability of two adjacent black pixels being hot pixels is low, there is a high probability that the hot pixels are accurately detected. In addition, as the weighted average is used as the offset value, the offset value changes gradually and is less susceptible to any error conditions in the charges related to the black pixels. An embodiment implementing the method of FIG. 2 is described below with reference to FIG. 3.

4. Analog Front End

Figure 3:
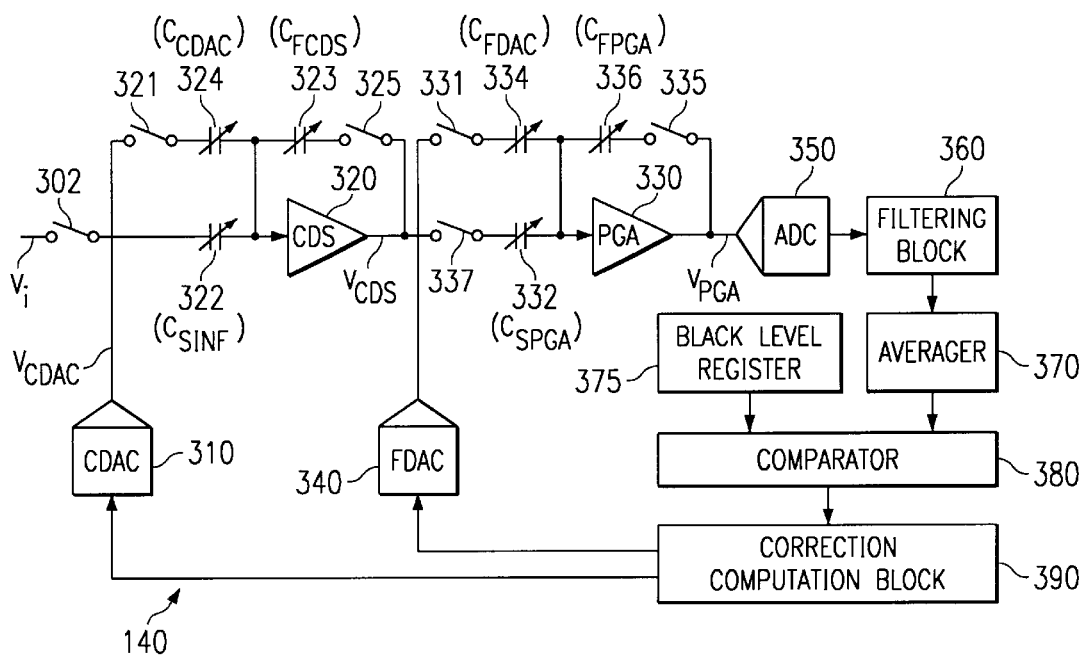
FIG. 3 is a block diagram illustrating the details of an embodiment of an analog front end provided in accordance with the present invention.

FIG. 3 is a block diagram of AFE 140 illustrating the details (in one embodiment) as relevant to an understanding of several aspects of the present invention. AFE 140 is shown containing course digital to analog converter (CDAC) 310, fine DAC 340, correlation double sampler (CDS) 320, gain amplifier 330, analog to digital converter (ADC) 350, filtering block 360, averager 370, black level register 375, comparator 380 and correction computation block 390. The operation of the capacitors and switches of FIG. 3 is described in the sections below. It may be appreciated that the computation of the offset is performed in digital domain while the correction is performed in the analog domain as described below in further detail.

ADC 350 receives analog signals which are corrected according to the offset determined by correction computation block 390 and by the configuration of various capacitors. ADC 350 samples the received analog signals to generate the digital values representing image 100. The digital values may accurately represent image 100 as the offset correction has already been performed.

Filtering block 360 is operational during the reception of pixels in the black pixels. Filtering block 360 determines whether a received digital value represents a hot pixel and communicates the result of determination to averager 370. In addition, the black pixel values are also sent to averager 370. Averager 370 computes an average value based on the black pixels which are not hot pixels. The average value may represent a weighted average of black pixels in several lines. An embodiment of averager 370 and filtering block 360 is described below.

Comparator 380 and black level register 375 facilitate a user to define a value which is potentially not equal to zero as representing black color. Black level register 375 stores such a user defined value. Comparator 380 subtracts the value in the black level register 375 from the average value generated by averager 370 to generate the offset. The parts of averager 370, comparator 380 and correction computation block 390 which together generate the offset form an example implementation of an offset generation circuit.

Correction computation block 390 generates appropriate digital values consistent with the output of comparator 380. The digital values are provided as inputs to CDAC 310 and FDAC 340, and the provided values together determine the offset correction. In general, a value provided to CDAC 310 causes a coarse correction to be attained, and a value provided to FDAC 340 causes a fine correction to be attained. The digital values (or offset in general) are adjusted iteratively until the undesirable components are accurately determined based on the black pixels.

In one embodiment, correction computation block 390 may start at a low offset value and increment the offset value during each iteration (e.g., after each line) until a desired correction level is reached. For fast convergence, the rate of change may be made proportionate to the present error (i.e., difference of accurate correction value and the present value). In addition, correction computation block 390 may clip the change in offset between successive lines to a ceiling value potentially programmable by a user, and the average or clipped value (in case average exceeds the ceiling value) is used to drive the two DACs. By clipping the values, bands may be avoided in the reproduced image. The operation of correction computation block 390 is described in further detail with reference to FIG. 5 below.

CDAC 310 and FDAC 340 convert the received digital values into analog signals, which determine the extent of correction of the active pixel digital values. The voltage levels generated by CDAC 310 and FDAC 340 are respectively represented by Vcdac and Vfdac. The outputs of CDAC 310 and FDAC 340 are respectively connected to capacitors Ccdac 324 and Cfdac 334 via switches 321 and 331. The second terminal (input) of capacitors Ccdac 324 and Cfdac 334 is connected respectively to feedback capacitors Cfcds 323 and Cfpga 336.

It should be appreciated that the course and fine DACs respectively effect corrections with course and fine granularities. By using the two DACs, one may conveniently avoid a single DAC with a very high resolution. However, embodiments using a single DAC are also contemplated to be within the scope and spirit of several aspects of the present invention.

Switches 302, 321, 337 and 331 are respectively closed (by a controller, which is not shown in the Figures) to charge the capacitors Csinp 322, Ccdac 324, Cspga 332 and Cfdac 334. In one embodiment, the four switches may be kept closed for half a clock cycle and open for another half cycle. Switches 325 and 335 are also closed for the other half of the clock cycle during the amplification of the input signals Vi and Vcds.

CDS 320 performs correlation double sampling well known in the relevant arts. In addition, CDS 320 amplifies the input signal Vs received via switch 302 and sampling capacitor Csinp 322. The capacitances of the capacitors are indicated by the same alphabetical part of the reference label (e.g., Ccdac represents the capacitance of capacitor Ccdac 324) in the present application. The output Vcds of CDS 320 is provided by the equation:

$$Vcds = (Vi * Csinp / Cfcds) - (Vcdac * Ccdac / Cfcds) \quad \text{Equation (1)}$$

wherein '*' represents a multiplication operation.

Gain amplifier 330 amplifies Vcds signal received via switch 337 and sampling capacitor Cspga 332. The output Vpga of gain amplifier 330 is given by the equation:

$$Vpga = (Vcds * Cspga / Cfpga) - (Vfdac * Cfdac / Cfpga) \quad \text{Equation (2)}$$

From Equations (1) and (2), it may be readily observed that the input signal Vi is amplified and the offset correction is performed prior to sampling by ADC 350. The extent of amplification and correction are determined by the capacitances. The values using which the capacitors are conveniently configured is described below with several examples.

Thus, AFE 140 may accurately determine the hot pixels and correct the output of CCD 130 to facilitate precise reproduction of image 110. The description is continued with example embodiment(s) of filtering block 360 and averager 370.

5. Amplification of Input Signal Vi

Depending on the signal strength range expected of Vi, a user (which uses the circuit of FIG. 3) may specify the total amplification desired for the input signal. Higher amplification is generally appropriate for weaker input signals. The total amplification may then be split for the two stages. The sampling and feedback capacitors in each stage may be programmed consistent with the amplification sought in the corresponding stage.

For illustration, it is assumed that a total gain of 15 db is desirable, which corresponds to 12 db+3 db. 12 db corresponds to a gain of 4 and 3 db corresponds to a gain of 1.41. The split may be decided by an internal decoder logic as 12 db (gain of 4) for CDS 320 and 3 db(1.41) for PGA 330. Accordingly, Csinp/Cfcds is set equal to 4, and Cspga/Cfpga is set equal to 1.41. Hence Csinp 322 is adjusted to 4 units (say pF) and Cfcds 323 to 1 unit (say 1 pF) to give gain of Cs/Cf=4. As a result, the input signal is amplified by 15 db before sampling by ADC 350.

Capacitors Ccdac 324 and Cfdac 334 may be conveniently configured to control the correction range and resolution as described below in further detail.

6. Correction Range

Correction range refers to the total offset correction which may be effected on the input signal Vi. It is often desirable to keep the correction range constant (at least-approximately) such that the specific offset correction can be independent of the amplification sought to be achieved on the input signal Vi. An example may further clarify the requirement.

Suppose the voltage range of input signal is expected to be 1 Volt, for which total amplification of 1 may be suitable. On the other hand, if the expected range is 0.5 Volts, a gain of 2 may be more appropriate. Similarly, if the expected range is 0.1 Volts, a gain of 10 may be appropriate. In all the three examples, the offset correction need not scale (be amplified) with the signal. That is, if the desired offset is 0.05 Volts, the total correction should ideally be only 0.05 Volts (for each pixel) irrespective of the gain desired on the input signal Vi. Such an effect may be achieved by keeping the correction range constant as described below in further detail.

The correction range may be kept constant by keeping the ratio Ccdac to Csinp constant. To further appreciate why such a relationship provides the desired result, assume hypothetically that a voltage Vcdac' is subtracted from Vi before amplification by CDS 320 (and without being affected by charge on Ccdac 324). The output Vcds in such a situation would be:

$$Vcds=(Vi-Vcdac')*Csinp/Cfcds \quad \text{Equation (3)}$$

From Equations (1) and (3):

$$(Vi*Csinp/Cfcds)-(Vcdac*Ccdac/Cfcds)=(Vi-Vcdac')*Csinp/Cfcds$$

$$Vcdac*Ccdac/Cfcds=Vcdac'*Csinp/Cfcds \quad \text{Equation (5)}$$

$$Vcdac'=Vcdac*Ccdac/Csinp \quad \text{Equation (6)}$$

As the maximum value of Vcdac is typically a constant, the maximum range (or upper limit) of offset correction may be maintained a constant by keeping Ccdac/Csinp constant. That is, Csinp may be determined by the desired amplification of input signal Vi, but Ccdac may be configured to keep the ratio constant. By keeping the correction range constant, the offset correction can be made to be independent of the amplification sought to be attained on the input signal Vi.

7. Correction Resolution

In general, it is desirable to have flexibility to correct the signal up to a resolution one least significant bit (LSB) of ADC 350. An aspect of the present invention enables such as an objective to be achieved by keeping the ratio Cfdac to Cfpga constant as described below in further detail.

As may be observed from Equation (2) above, the correction due to Vfdac is given by the term–(Vfdac*Cfdac/Cfpga). A change by 1 in the input of FDAC (i.e., 1 LSB of FDAC 340) typically results in a change of voltage in Vfdac of (maximum voltage–minimum voltage of FDAC 340)/2 (number of bits of inputs to FDAC 340), which equals a constant. Similarly, 1 LSB of ADC 350** may also be observed to be a constant.

Thus, by keeping Cfdac/Cfpga a constant, the relationship between 1 LSB of FDAC and 1 LSB of ADC 350 may be maintained predictable (constant) from the perspective of operation of correction computation block 390. When effecting offset corrections, correction computation block 390 may first cause corrections in course grain (i.e., CDAC 310), and then use fine course corrections using FDAC 340. The description is now continued with reference to example embodiment of filtering block and averager 370.

8. Filtering block 360 and Averager 370

Figure 4:
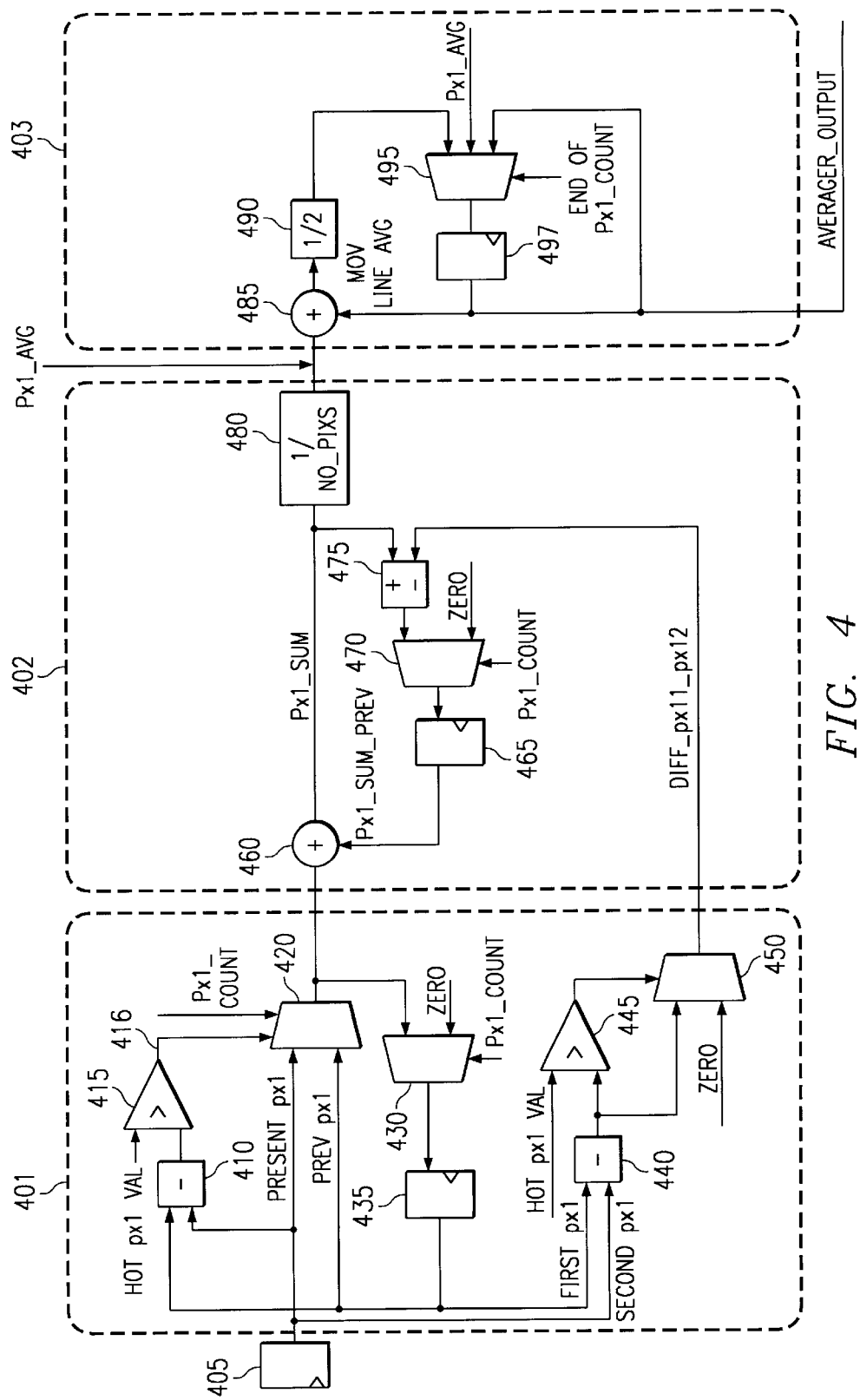
FIG. 4 is a block diagram illustrating the details of an embodiment of a filtering block and a averager provided in accordance with the present invention.

FIG. 4 is a block diagram illustrating the details of filtering block 360 and averager 370 in one embodiment. The diagram is shown containing three components 401, 402, and 403. Broadly, component 401 deals with determination of hot pixels, component 402 generates an average for black pixels in a line, and component 403 generates a weighted average of the lines. Each component is described below in further detail.

With respect to component 401, delay element 405 receives a present pixel value from ADC 350. A previous pixel value is provided from delay element 435. Adder 410 generates a difference of the present pixel value and the previous pixel value. Comparator 415 compares the difference with a threshold value and generates a logical value 416 indicating whether the difference exceeds the threshold or not. That is, logical value 416 indicates whether the present pixel is a hot pixel or not if the present pixel is a black pixel.

Pxl_count indicates whether a presently received pixel is in black area or active area. Multiplexor 420 selects the present pixel unless the pxl_count and logical value 416 together indicate that the present pixel is a hot pixel. Multiplexor 430 selects the output of multiplexor 420 if pxl_count indicates that the presently received pixel is the in the black area.

The remaining parts of component 401 enable the first pixel value to be forwarded to added 460 without having to wait for the second pixel value. Adder 440 receives the first pixel value and the second pixel value and generates a difference (pixel1–pixel2), wherein pixel1 and pixel2 respectively represent the values of the first and second black pixels in a line. Comparator 445 determines whether the difference exceeds the threshold value (similar to comparator 415).

Multiplexor 450 selects zero if the first pixel is determined not to be hot. Multiplexor 450 selects zero in the case of all other black pixels. If the first pixel of a line is a hot pixel, then pixel1–pixel2 is passed as the output of multiplexor 450. The output of multiplexor 450 is later subtracted by adder 460, with the result the second pixel in a line replaces the first pixel if the first pixel is a hot pixel.

With respect to component 402, the loop there generates a sum of the black pixel values, which are used for generating a line average. Adder 460 receives the first black pixel, even if it is a hot pixel. In the case of subsequently received black pixels, a previous pixel (or value specifically) is received in lieu of a present pixel if the present pixel is determined to be a hot pixel.

Adder 475 usually subtracts a value of zero (received from multiplexor 450) from the output of adder 460, except in situations when the first black pixel of a line is a hot pixel. When the first black pixel is a hot pixel, multiplexor 450 sends a value of (pixel1–pixel2), and adder 475 receives a value of pixel+pixel2 at the same time or clock cycles. A value of 2 times pixel2 is generated due to the subtraction, which implies that pixel2 is substituted for pixel1 when the first pixel is a hot pixel.

Multiplexor 470 selects zero as the input at the beginning of a line. Delay element 465 stores and forwards the output of multiplexor 470 to adder 460. Adder 460 continues with the addition. Thus, the output of adder 460 represents a sum of a desired number of black pixels (with a previous pixel being substituted for a present pixel if the present pixel is a black pixel, except that the second pixel is used if the first pixel is a black pixel).

Divider 480 divides the sum generated by adder 460 by the number of pixels used in the computation of the sum. In an embodiment, the number is chosen to be a power of 2 such that divider 480 may be implemented as a shift register. Thus, the output of divider 480 represents a line average at the end of the reception of black pixels of each line.

With respect to component 403, the loop there computes a weighted average of several line averages. Adder 485 is reset to zero at the beginning of processing of each image frame. Divider 490 divides the output of adder 485 by two. Delay element 497 stores the output of multiplexor 495 and provides the stored value as an input to adder 485.

Multiplexor 495 selects the output of divider 490 except in situations noted below. Multiplexor 495 is designed to select the output of divider 480 after the reception of the first line such that the output of averager 370 equals the average value of the first line itself (and not half of it). Multiplexor 495 is designed to select the output of delay element 497 in situations when the line average is determined to be erroneous. An error may arise, for example, when the components of AFE 140 are not yet configured during initial power-up or boot-up process.

Thus, the output of adder 485 represents the expression (n/2+(n−1)/4+(n−2)/8+ . . . ), wherein '−' represents subtraction, '/' represents division, n represents the average for a present line, n−1 the average for a previous line, and the numbers 2, 4, and 8 represent the associated weights. It should be understood that the offset may be generated using different types of weights as also, and such implementations are contemplated to be within the scope and spirit of the present invention.

The weighted average computed at the end of each line may be used to drive CDAC 310 and FDAC 340. Once the offset correction is performed by the outputs of the DACs, the corrected voltage levels are sampled by ADC 350. Due to the potentially accurate offset correction, the digital outputs of ADC 350 may accurately represent image 110. The description is continued with reference to the manner in which correction computation block 390 may change the offset in response to the error determined by averager 370.

9. Correction Computation Block 390

Figure 5:
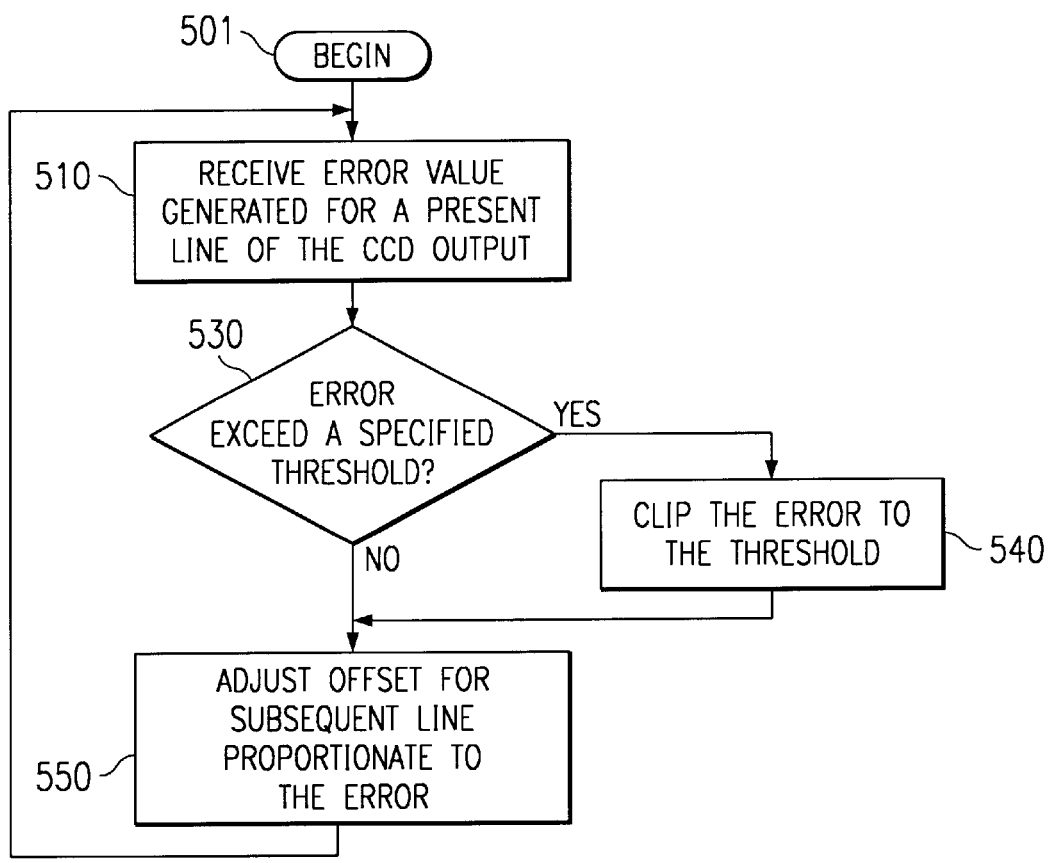
FIG. 5 is a flow chart illustrating the manner in which an offset is changed according to an aspect of the present invention.

FIG. 5 is a flow chart illustrating the operation of correction computation block 390 in an embodiment. The method begins in step 501, in which control immediately passes to step 510. In step 510, correction computation block 390 receives an error value computed typically at the end of reception of the black pixels for each line.

In step 530, correction computation block 390 determines whether the received error value exceeds a specified threshold. The threshold is preferably programmable by a user. If the error value exceeds the threshold, control passes to step 540 or else control passes to step 550. In step 540, the error value is clipped to the threshold and control then passes to step 550.

In step 550, the offset is adjusted proportionate to the error and the two DACs are configured according to the adjusted offset. Control then passes to step 510. While the adjustment is described as being performed after clipping (of step 540), it should be understood that the adjustment may be performed without clipping also. As the offset is adjusted proportionate to the error, the offset correction may converge quickly to the steady state value. Thus, different aspects of the present invention allow for useful features in the offset correction of the CCD output.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of capturing an image in a digital form, said method comprising:

allowing a light corresponding to said image to be incident on a charge coupled device (CCD), wherein said CCD contains a plurality of pixels, wherein each of said plurality of pixels stores a charge proportionate to the intensity of incident light and the time of incidence of said light on the pixel, said plurality of pixels further containing a plurality of black pixels and a plurality of active pixels, wherein said plurality of black pixels are not exposed to said light and said plurality of active pixels are exposed to said light;

generating a voltage level corresponding to the charge in each of said plurality of pixels;

comparing the voltage level of a present black pixel with the voltage level of a previous black pixel to generate a difference;

determining that said present black pixel is a hot pixel if said difference exceeds a threshold value;

computing an offset based on black pixels which are determined not to be hot pixels;

applying said offset to the voltage level of said plurality of active pixels to generate a corresponding plurality of corrected voltage levels; and sampling said plurality of corrected voltage levels to generate a corresponding plurality of digital values, wherein said plurality of digital values represent said image in said digital form.

2. The method of claim 1, wherein said computing comprises:

determining an average for each line contained in said image; and generating a weighted average of a plurality of lines, wherein said offset is determined according to said weighted average.

3. The method of claim 1, wherein said computing comprises substituting an adjacent pixel for each hot pixel.

4. The method of claim 3, wherein said adjacent pixel comprises a previous pixel.

5. The method of claim 4, wherein said computing comprises:

providing said previous pixel in lieu of said present pixel if said present pixel is determined to be a hot pixel;

adding each of said present pixels or the corresponding provided previous pixel to generate a sum for each line; and dividing said sum by a number of added pixels to generate a line average.

6. The method of claim 5, wherein said adding further comprises adding a second pixel in a line in lieu of a first pixel if said first pixel is a hot pixel.

7. The method of claim 1, wherein said computing comprises determining an error for each line, and said method further comprises clipping at a ceiling value said error for successive lines.

8. A method of correcting the output of a charge coupled device (CCD), said output containing a plurality of lines, each of said plurality of lines containing a plurality of black pixels and a plurality of active pixels, said method comprising:

(a) correcting said output by an offset;

(b) determining an error in offset correction by examining said plurality of black pixels;

(c) clipping said error to a pre-determined threshold if said error exceeds said pre-determined threshold; and (d) adjusting said offset according to said pre-determined threshold to generate a new offset if said difference value exceeds said pre-determined threshold, wherein said new offset is used as an offset for a line subsequent to a present line.

9. The method of claim 8, further comprising adjusting said offset according to said error determined in (b) if said error does not exceed said pre-determined threshold.

10. The method of claim 8, wherein said error of (b) is based on a plurality of previous lines.

11. The method of claim 8, further comprising starting said offset at a low value and adjusting said offset proportionate to said error such that said error approaches zero quickly.

12. A method of correcting the output of a charge coupled device (CCD), said output containing a plurality of lines, each of said plurality of lines containing a plurality of black pixels and a plurality of active pixels, said method comprising:

(a) correcting said output by an offset;

(b) determining an error in offset correction by examining said plurality of black pixels; and (c) adjusting said offset proportionate to said error to generate a new offset, wherein said new offset is used as an offset for a line received subsequent to a present line.

13. A circuit for correcting the output of a charge coupled device (CCD), said output containing a plurality of lines, each of said plurality of lines containing a plurality of black pixels and a plurality of active pixels, said circuit comprising:

means for correcting said output by an offset;

means for determining an error in offset correction by examining said plurality of black pixels;

means for clipping said error to a pre-determined threshold if said error exceeds said pre-determined threshold; and means for adjusting said offset according to said pre-determined threshold to generate a new offset if said difference value exceeds said pre-determined threshold, wherein said new offset is used as an offset for a line subsequent to a present line.

14. The circuit of claim 13, wherein said means for adjusting adjusts said offset according to said error if said error does not exceed said pre-determined threshold.

15. The circuit of claim 14, wherein said error is based on a plurality of previous lines.

16. The circuit of claim 14, further comprising means for starting said offset at a low value and adjusting said offset proportionate to said error such that said error approaches zero quickly.

17. A circuit of correcting the output of a charge coupled device (CCD), said output containing a plurality of lines, each of said plurality of lines containing a plurality of black pixels and a plurality of active pixels, said circuit comprising:

means for correcting said output by an offset;

means for determining an error in offset correction by examining said plurality of black pixels; and means for adjusting said offset proportionate to said error to generate a new offset, wherein said new offset is used as an offset for a line received subsequent to a present line.

18. A circuit determining an offset to be applied to the output of a charge coupled device (CCD), wherein said CCD comprises a plurality of active pixels and a plurality of black pixels, wherein each of said active pixels stores an amount of charge proportional to an intensity of incident light and a time of exposure of the active pixel to said incident light, said circuit comprising:

an analog to digital converter (ADC) sampling a plurality of corrected analog signals to generate a plurality of digital values, wherein each digital value relates to a corresponding black pixel;

a filtering block generating a difference of a digital value corresponding to a present black pixel and a digital value corresponding to an adjacent black pixel, said filtering block determining that said present black pixel is a hot pixel if said difference exceeds a threshold; and an offset generation circuit generating said offset based on said digital values of said black pixels which are determined not to be hot pixels, wherein the output of said CCD is corrected by said offset to generate said plurality of corrected analog signals.

19. The circuit of claim 18, wherein said offset generation circuit comprises an averager generating an average of digital values of said black pixels which are not hot pixels, wherein said average is used as said offset.

20. The circuit of claim 19, wherein said averager generates an average for each line of said image, said averager further generates a weighted average for a plurality of lines, wherein said weighted average is used as said offset.

21. The circuit of claim 19, wherein said adjacent pixel comprises a previous pixel.

22. The circuit of claim 21, wherein said filtering block provides said previous pixel in lieu of said present pixel if said present pixel is determined to be a hot pixel, said averager adding said previous pixel twice in generating said average.

23. The circuit of claim 22, wherein said offset generation circuit and said averager together add a second pixel in a line in lieu of a first pixel in said line if said first pixel is determined to be a hot pixel.

24. The circuit of claim 23, wherein said offset generation circuit and said averager together comprise:

first adder receiving digital values related to said first pixel and said second pixel of a line, and generating a second difference of the two received digital values;

a second adder adding the digital value representing said present pixel and a previous sum;

a first multiplexor forwarding said second difference if said first pixel is determined to be a hot pixel and zero otherwise;

a third adder subtracting the output of said first multiplexor from the output of said second adder, the output of said third adder being provided as said previous sum to said second adder; and a divider dividing the output of said second adder by a number of digital values added by said second adder, wherein the output of said divider represents the output of said line.

25. A device for capturing an image in a digital form, said device comprising:

a charge coupled device (CCD) containing a plurality of pixels, wherein each of said plurality of pixels stores a charge proportionate to the intensity of incident light and the time of incidence of said light on the pixel, said plurality of pixels further containing a plurality of black pixels and a plurality of active pixels, wherein said plurality of black pixels are not exposed to said light and said plurality of active pixels are exposed to said light;

a lens focusing light from said image on said plurality of active pixels; and an analog front end (AFE) generating a voltage level corresponding to the charge in each of said plurality of pixels, said AFE determining that a present black pixel is a hot pixel if the difference between the voltage levels of said present black pixel and an adjacent black pixel exceeds a threshold, said AFE computing an offset based on black pixels which are determined not to be hot pixels and applying said offset to the voltage level of said plurality of active pixels to generate a corresponding plurality of corrected voltage levels, said AFE sampling said plurality of corrected voltage levels to generate a corresponding plurality of digital values, wherein said plurality of digital values represent said image in said digital form.

26. The device of claim 25, wherein said AFE comprises:

an analog to digital converter (ADC) sampling a plurality of corrected analog signals to generate a plurality of digital values, wherein each digital value relates to a corresponding black pixel;

a filtering block generating a difference of a digital value corresponding to a present black pixel and a digital value corresponding to an adjacent black pixel, said filtering block determining that said present black pixel is a hot pixel if said difference exceeds a threshold; and an offset generation circuit generating said offset based on said digital values of said black pixels which are determined not to be hot pixels, wherein the output of said CCD is corrected by said offset to generate said plurality of corrected analog signals.

27. The device of claim 26, wherein said offset generation circuit comprises an averager generating an average of digital values of said black pixels which are not hot pixels, wherein said average is used as said offset.

28. The device of claim 27, wherein said averager generates an average for each line of said image, said averager further generates a weighted average for a plurality of lines, wherein said weighted average is used as said offset.

29. The device of claim 27, wherein said adjacent pixel comprises a previous pixel.

30. The device of claim 29, wherein said filtering block provides said previous pixel in lieu of said present pixel if said present pixel is determined to be a hot pixel, said averager adding said previous pixel twice in generating said average.

31. The device of claim 30, wherein said offset generation circuit and said averager together add a second pixel in a line in lieu of a first pixel in said line if said first pixel is determined to be a hot pixel.

32. The device of claim 26, wherein said offset generation circuit determines an error in offset correction performed based on said offset and adjusts said offset proportionate to said error.

33. device of claim 32, wherein said offset generation circuit clips said error at a pre-specified threshold value.

* * * * *